March 3, 1959 I. F. CHAPIN 2,875,857
ADJUSTABLE CYLINDER BRAKE
Filed June 1, 1954 5 Sheets-Sheet 1

INVENTOR.
IRVING F. CHAPIN
BY John A. Young
ATTORNEY

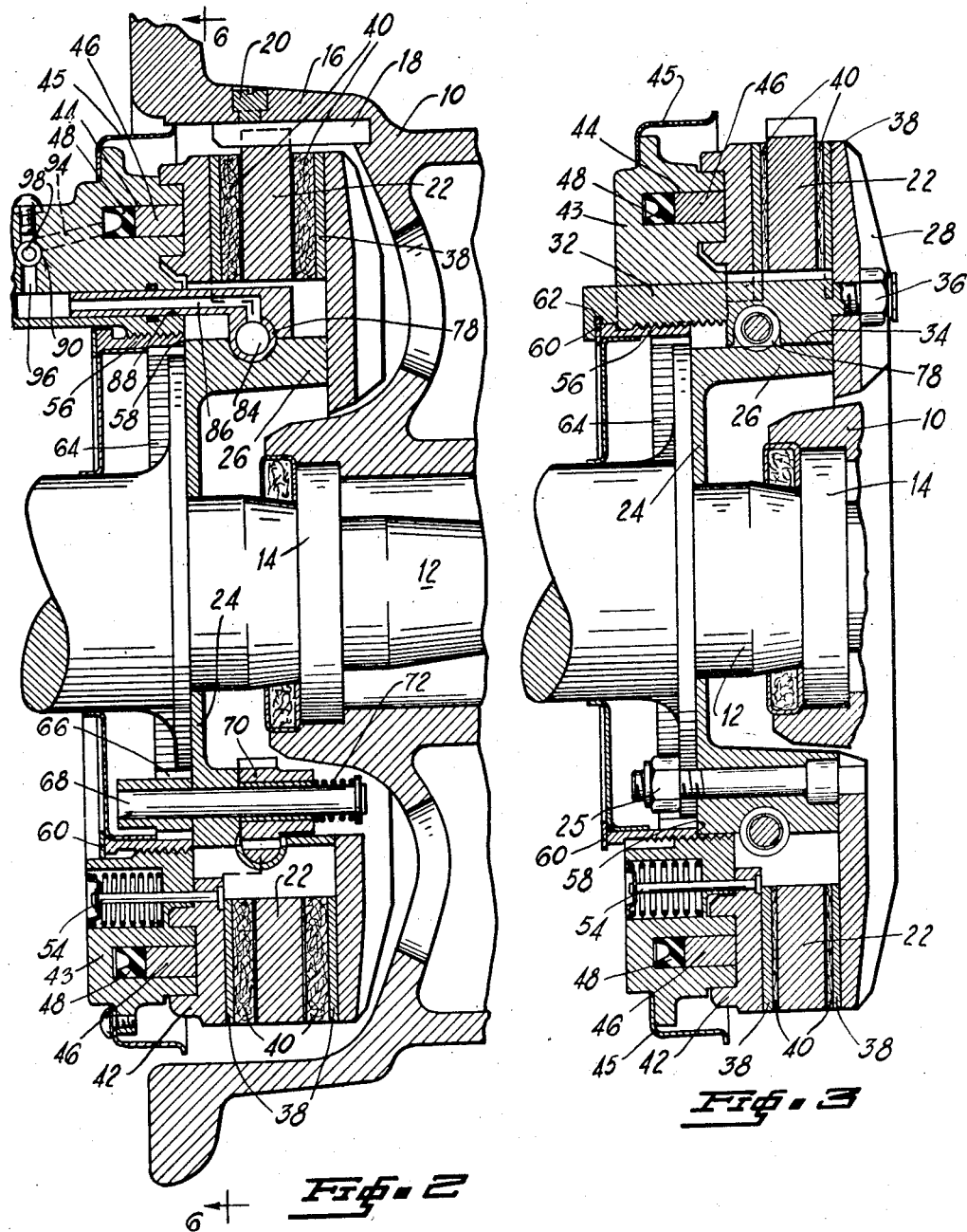

March 3, 1959 — I. F. CHAPIN — 2,875,857
ADJUSTABLE CYLINDER BRAKE
Filed June 1, 1954 — 5 Sheets-Sheet 3

INVENTOR.
IRVING F. CHAPIN
BY John A. Young
ATTORNEY

March 3, 1959 — I. F. CHAPIN — 2,875,857
ADJUSTABLE CYLINDER BRAKE
Filed June 1, 1954 — 5 Sheets-Sheet 4

INVENTOR.
IRVING F. CHAPIN
BY John A. Young
ATTORNEY

United States Patent Office 2,875,857
Patented Mar. 3, 1959

2,875,857

ADJUSTABLE CYLINDER BRAKE

Irving F. Chapin, South Bend, Ind., assignor to Bendix Aviation Corporation, South Bend, Ind., a corporation of Delaware Application June 1, 1954, Serial No. 433,364

5 Claims. (Cl. 188—72)

This invention relates to an adjustable cylinder for a brake of the disk variety; more specifically, the invention is designed to automatically adjust disk brakes according to extent of wear of friction material lining of the brake.

The conventional disk brake comprises, essentially, a stack of annular alternately rotatable and nonrotatable brake elements which are forced into frictional engagement between a stationary reaction plate and a movable pressure plate. Either the rotatable or nonrotatable brake elements are lined with friction material which will wear and decrease in width incident to normal usage. In order for the brake to operate efficiently some sort of adjusting means must be provided to compensate for the aforesaid wear and increasing clearance between contiguous brake elements. It has heretofore been common to make the reaction plate adjustable to compensate for friction material wear. The purpose for this, among other reasons, is that the pressure-applying side of the brake opposite the reaction plate incorporates the hydraulic actuating cylinder and return spring mechanisms for the brake. These parts are generally considered too cumbersome and complex to permit the addition of an adjusting means. In order to adjust a reaction plate in this location either the wheel must be removed, or special tools must be employed.

As will become apparent from the following description, I have provided an improved means for automatically adjusting the brake from its outboard side. The brake adjusts itself without requiring the attention of a mechanic or operator and without the need for special tools. In addition, my adjusting means indicates the extent of brake wear from the outboard side of the brake without disassembling the brake.

It is an object of this invention to effect automatically an adjustment of a disk type brake by means of hydraulic motor actuated by the same fluid pressure source which is utilized to apply the brake.

A further object of this invention is to obtain adjustment of the brake by a fluid motor having a fluid pressure responsive element movable in an arcuate path so as to reduce to a minimum the required space for the adjustor.

An additional object of the invention is to provide control means for the automatic adjustor which will be operable with sensitivity sufficient to maintain accurate adjustment yet avoid over-adjustment.

Another object of the invention is to provide an axially movable fluid actuator which is utilized to apply the brake, the axial movement of the fluid actuator being accomplished according to extent of wear of lining surface of the brake.

Other objects and advantages of my invention will become apparent as the description proceeds. In the drawings which accompany the description:

Figure 2 is a sectional view taken on the line 2—2 of Figure 1 illustrating the wheel and brake and showing the friction material lining of the brake before any wear thereof;

Figure 3 is a sectional view taken on the line 3—3 of Figure 1 showing the friction material lining of the brake after it has worn appreciably;

Figure 1:
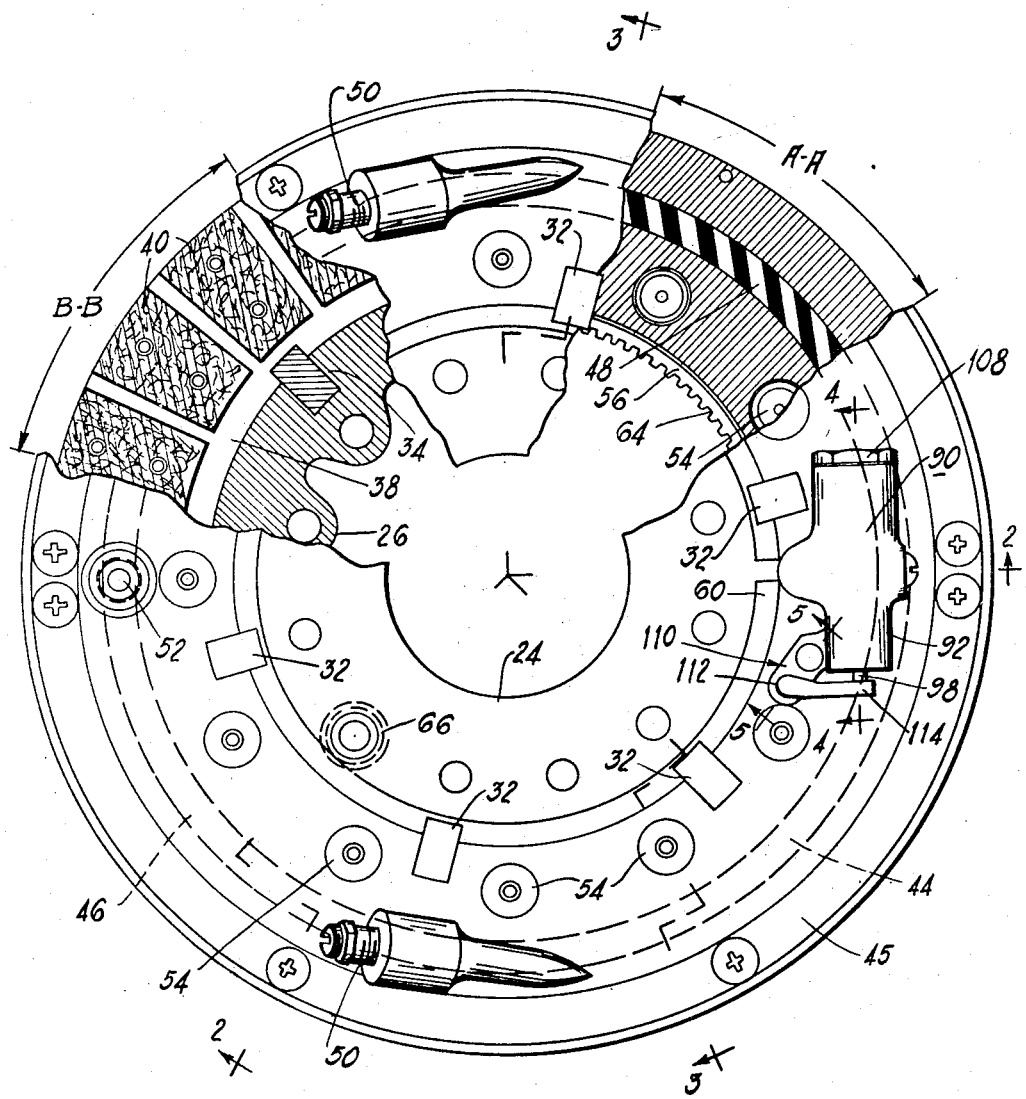
Figure 1 is a side elevation of one form of my invention, showing in partial sections, taken along the lines A—A and B—B, the cylinder and friction material lining of the brake.

Referring to Figures 1, 2, and 3, the disk brake assembly shown includes a wheel 10 rotatably supported on a nonrotatable spindle or axle 12, by bearings 14. The wheel has an axially extending flange 16 to which is fastened a plurality of circumferentially spaced keys 18 which extend along the axis of the wheel and are fixed thereto by bolts 20. An annular disk-like brake element 22 is carried on keys 18 for rotational movement with the wheel 10.

A brake support plate 24 is fastened by bolts 25 to axle 12 through the axle flange. The support plate 24 is provided with an integral, axially extending flange 26 having a plurality of circumferentially spaced key ways 34. A plurality of spaced bars on torque sustaining members 32 are received in the key ways 34. One end of the bars 32 is threaded to form bolts 36 which are used to secure a brake backing plate 28 against flange 26. The bars 32 are further employed to prevent rotation of the brake backing plate 28.

A pair of annular stator plates 38 are carried on bars 32 for axial movement thereon. To each stator plate is riveted or otherwise securely fastened friction material 40. An annular pressure plate 42 is keyed to bars 32 so that it is capable of sliding axial movement but is locked against rotational movement. On the extreme left end of bars 32 is carried an annular cylinder 43 containing annular chamber 44. Bearing against pressure plate 42 is an annular piston member or force-transmitting member 46 which is reciprocable in annular chamber 44. An annular seal 48 is carried on the head of piston member 46 to prevent loss of fluid from chamber 44. On the outer periphery of chamber 44 is carried a ring-like dust cover 45.

As seen in Figure 1, chamber 44 is provided with two bleeder ports 50—50. Either port may be used to exhaust air from the chamber when it is initially filled with fluid, depending upon which one happens to be uppermost when assembled on the right or left side of the vehicle. Opening 52 serves as the fluid inlet port in all cases. Upon admission of fluid pressure to chamber 44, piston member 46 will be forced to the right against pressure plate 42. This action will force friction material 40 into contact with the rotating brake element 22 to inhibit rotation of the wheel. Upon release of fluid pressure in chamber 44, a plurality of return spring mechanisms 54 will force the pressure plate and piston member to the left, thereby releasing the brake.

As the brake is used, the friction material 40 will wear and reduce in thickness with the result that the clearance between the friction material and brake element 22 will increase. As the friction material wears, piston member 46 and pressure plate 42 must travel further to apply the brake so that the stroke of the brake control lever will be greater and the brake will not respond to movement of the control as quickly as it should. In order for the brake to operate efficiently the friction material must lie in close proximity. To compensate for wear, chamber 44 and piston member 46 are forced axially to the right (see Figure 3) by means of an automatic adjusting means which is actuated by the same fluid pressure used to actuate piston member 46.

The automatic adjusting means includes a ring nut 56 which threadedly engages the inner periphery of annular cylinder 43. The ring nut is carried between annular shoulder 58 defined by support plate 24 and an expansible retaining ring 60. The retaining ring is split at one point in its circumference so that it may be snapped into slots 62 formed in bars 32. With this construction, the ring nut is capable of rotational movement but locked against axial movement so that rotation of the ring nut will force annular cylinder 43 and chamber 44, which is contained therein, to move axially. On the inner periphery of ring nut 56 there is formed a gear track 64 which meshes with pinion gear 66 as shown in Figure 2. Pinion 66, in turn, is securely fixed to shaft 68. On the opposite end of shaft 68 is carried a driver gear 70 which is connected to the shaft by means of a one-way clutch or ratchet spring 72. Gear 70 is connected to spring 72 so that rotation of the gear in one direction will cause the spring to wind around and grip shaft 68 to thereby transmit torque to pinion 66. Rotation of gear 70 in the opposite direction will tend to unwind the spring from shaft 68 so that it is incapable of torque-transmission.

Figure 6:
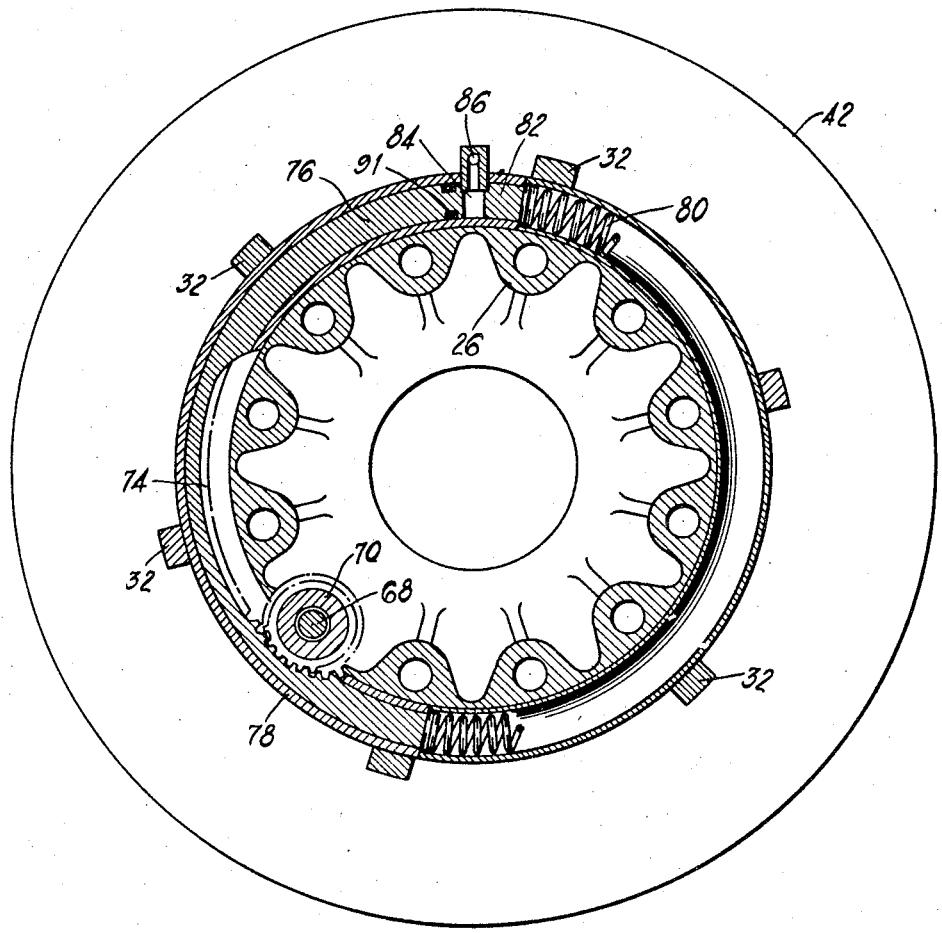
Figure 6 is a section taken along line 6—6 of Figure 2 showing the curved actuating piston for the automatic adjusting means of the invention.

Referring to Figure 6, it can be seen that gear 70 meshes with a second gear track 74 formed in curved piston member 76. Member 76 is slidably received within a split annular tube 78 which is carried by flange 26 (as best shown in Figures 2 and 3). A coil spring 80 tends to force member 76 clockwise. Reaction from spring 80 is taken by a plugging member 82 which is inserted into the tube. Between the uppermost end of member 76 and plugging member 82 is a small chamber 84 which communicates with a conduit 86 shown in Figure 2. A ring seal 91 encircles the uppermost end of the piston member to prevent escape of fluid from chamber 84. Conduit 86 is fitted into an associated axial bore 88, and bore 88 communicates with the valve means for the automatic adjuster, indicated generally at 90.

Figure 4:
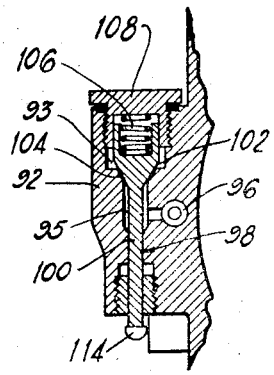
Figure 4 is a section taken on the line 4—4 of Figure 1 showing valve means of the invention.

As shown in Figures 2 and 4, the valve means includes a housing 92, an inlet passage 94 which communicates with annular chamber 44, and an outlet passage 96 which communicates with bore 88. Communication between the inlet and outlet passages through chambers 93 and 95 is controlled by valve element 98 slidably received within housing 92. The valve element has a transversely-extending shank 100 and a conical portion 102 which bears against conical valve seat 104. A coil spring 106 is interposed between one end of valve element 98 and an end cap 108 to force the valve element against valve seat 104.

Figure 5:
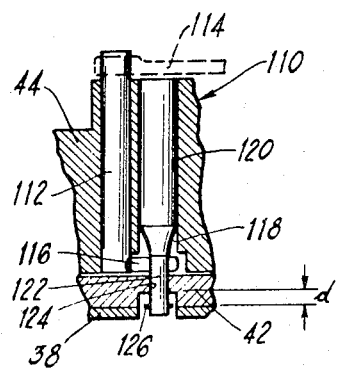
Figure 5 is a section taken along line 5—5 of Figure 1 showing an actuating mechanism for the valve of Figure 4.

In order to unseat the valve element and allow communication between the inlet and outlet passages, an actuating lever mechanism, generally indicated at 110, is provided as shown in Figures 1 and 5. This mechanism comprises a rotatable shaft 112 having a pair of lever arms 114 and 116 securely fastened to its upper and lower extremities, respectively. Lever arm 114 engages the end of shank 100 so that counterclockwise rotation of the mechanism as shown in Figure 1 will unseat valve element 98 from valve seat 104 and permit communication between passages 94 and 96. Lever arm 116 operatively engages a cam surface 118 formed in member 120 which is slidably received in the body of cylinder chamber 44. Member 120 has a reduced diameter portion 122 at its one end which extends through an aperture 124 formed in pressure plate 42. The end of member 120 which extends through aperture 124 is fitted with a retaining ring 126 which will be engaged by pressure plate 42, provided the stroke of piston member 46 and movement of pressure plate 42 is equal to or greater than the distance "$d$" (see Figure 5). In effect pressure plate 42 functions as a "wear sensing element."

Operation of the device is as follows: Assuming that the friction lining material is in its unworn condition shown in Figure 2, the stroke of piston member 46 and pressure plate 42 will not be in excess of the distance "$d$." However, as the friction material wears, a point will necessarily be reached at which the stroke will be equal to distance $d$. At this point pressure plate 42 will engage retaining ring 126 and force member 120 to slide axially with the pressure plate. The movement of cam surface 118 on member 120 will force lever arm 116, shaft 112, and lever arm 114 counterclockwise, thereby unseating valve element 98 to allow communication between passages 94 and 96. Since the fluid in chamber 44 is under pressured during movement of the aforementioned parts, fluid pressure will pass from chamber 44 through passage 94, chambers 93 and 95, passage 96, conduit 86, and into chamber 84 to force piston member 76 counterclockwise as shown in Figure 6. One way clutch 72 will transmit torque in this direction to shaft 68 and gear 66 to thereby rotate ring 56 and force annular cylinder 43 and chamber 44, which is contained therein, axially to the right. Upon release of fluid pressure in chamber 44, coil spring 80 will force piston member 76 clockwise thereby forcing fluid from chamber 84 through the valve means 90 and back into chamber 44. Due to the conical shape of valve element 98, it will be automatically unseated by fluid flowing from chamber 84 into chamber 44. Note that during the return stroke of piston member 76 gear 70 will rotate about shaft 68 without torque transmission to pinion 66 because of one way clutch 72. After fluid is discharged from chamber 84, spring 106 of valve means 90 will close the valve means and force lever arms 114 and 116 and shaft 112 clockwise to their original position. This action will, in turn, force member 120 upward because of the action of arm 116 on cam surface 118. The present arrangement, therefore, provides for a brake which will be automatically adjusted so that the rotatable and nonrotatable brake elements will always lie in close proximity. In Figure 3 the brake is shown after a considerable amount of wear of friction material 40. Note that the degree of brake wear may be easily detected by noticing the amount of movement of annular cylinder 43 to the right.

Figure 7:
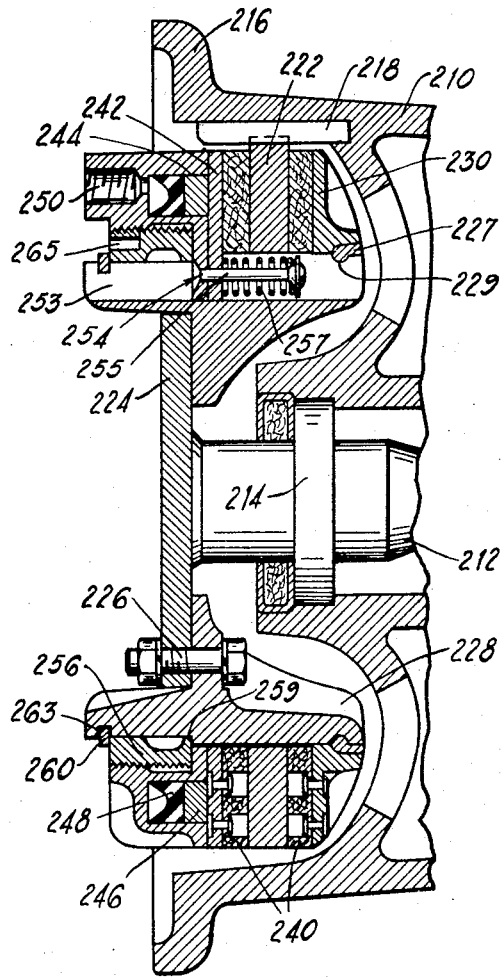
Figure 7 is a vertical section of a modified form of the invention.
Figure 8:
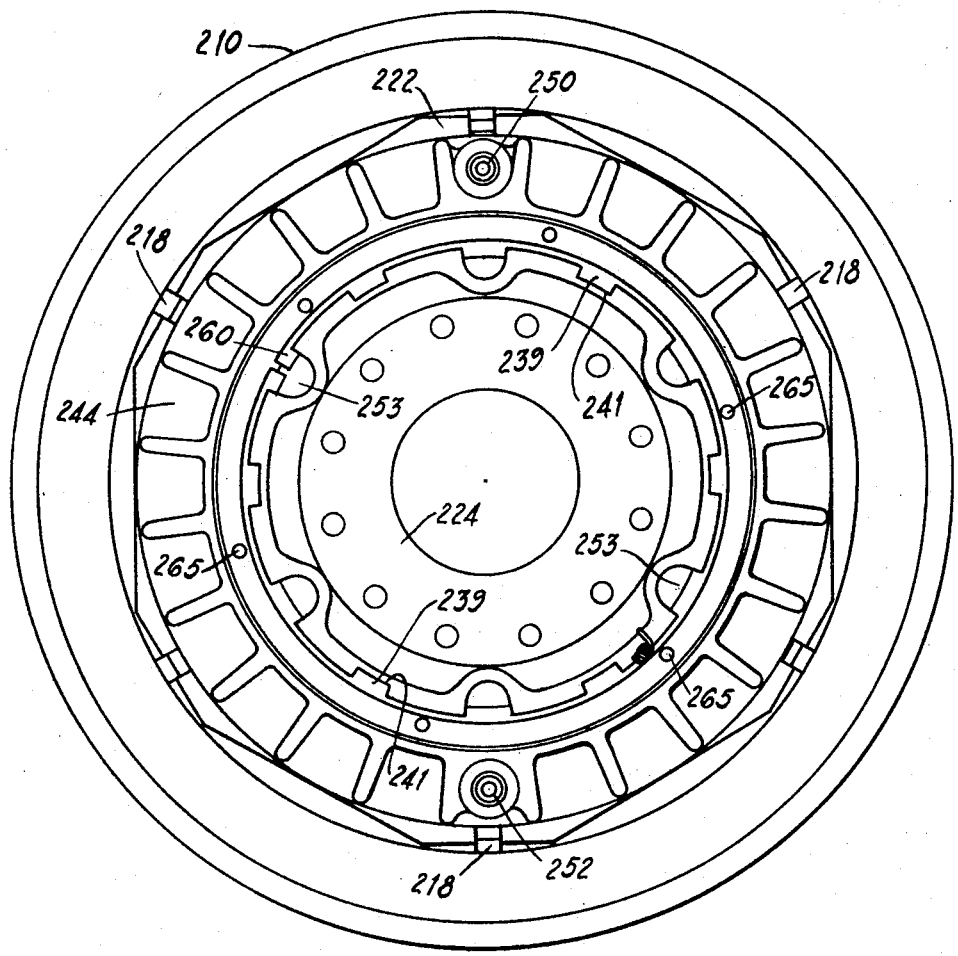
Figure 8 is a side view of Figure 7.

In Figures 7 and 8, the brake shown is substantially that shown in Figure 1 except that it is manually adjustable rather than automatic. It has an annular element 222 rotatably carried on wheel 210 by axially extending keys 218. Brake support plate 224 and flange 228 are bolted together by bolts 226. Backing plate 230 is separable from flange 228 and is held in place by a retaining ring 227. The retaining ring is split at one point in its circumference so that it may be snapped into annular channel 229 after backing plate 230 is placed in position. Friction material 240 is riveted directly to backing plate 230 and pressure plate 242. The pressure plate and cylinder chamber 244 are keyed to flange 228 by a series of circumferentially spaced projections 239 which slide in companion slots 241 which are formed in the outer periphery of the flange. The brake actuating means of the present brake is very similar to that shown in Figures 1, 2 and 3 and comprises an annular piston member 246 reciprocable within cylinder chamber 244. The piston member is provided with an annular seal 248. The cylinder chamber is provided with inlet and bleed ports 250 and 252. Spring return mechanisms 254 are carried within a series of circumferentially spaced bores 253 and comprise a stem 255 having an abutment at one end which engages cylinder chamber 244. A spring 257 is interposed between an abutment on the other end of the stem and pressure plate 242 to force the pressure plate in contact with the cylinder chamber 244.

Ring nut 256 is carried between an annular shoulder 259 and snap ring 260. The snap ring, like retaining ring 227, is split at one point in its circumference so that it can fit into a companion race 263 formed in flange 228. A plurality of bores 265 are provided in the ring nut so that any suitable tool may be inserted therein to turn the ring nut and force cylinder chamber 244 to move axially.

Although this invention has been described in connection with certain specific embodiments it will be understood by those skilled in the art that various changes in shape and arrangement of parts can be made to suit requirements without departing from the spirit and scope of the invention.

Having thus described my invention what I claim as new and desire to secure by Letters Patent is:

1. A wheel and brake assembly including a stationary axle, a wheel rotatable on said axle, a brake element rotatable with said wheel, means carried by said axle for effecting frictional engagement with said brake element comprising a stationary backing plate carried at one side of said brake element, a pressure plate axially movable with respect to said axle and carried at the other side of said brake element, said backing plate and pressure plate being lined with friction material, a force-transmitting member arranged to act on and move the pressure plate against said brake element, an axially adjustable housing having a fluid pressure chamber therein within which said force transmitting member is reciprocable, an axially fixed annular member threadedly engaging said housing whereby rotation of the member will force the housing to move axially, and means for automatically rotating said annular member to axially reposition said housing and force transmitting member as the friction material lining wears, said last-mentioned means including a gear track formed in said annular member, a first gear meshed with said gear track, a second gear arranged to drive said first gear in one direction only, means for rotating said second gear including a hydraulic piston having a gear track formed therein to mesh with said second gear, a cylinder chamber for said piston, means connecting said fluid pressure chamber with said cylinder chamber, said piston being moved to rotate said first and second gears by fluid pressure applied to said fluid pressure chamber, normally closed valve means for controlling application of fluid pressure to said piston, and means for opening said valve means comprising a slidable member carried by said housing to be engaged by said pressure plate upon movement of the pressure plate toward said brake element, engagement between said member and pressure plate being affected after a predetermined degree of friction material wear, a cam surface formed in said slidable member, and a lever mechanism operatively engaging said cam surface and arranged to open said valve means upon movement of said slidable member produced by said pressure plate.

2. A wheel and brake assembly comprising a stationary axle, a wheel rotatable on said axle, a brake element rotatable with said wheel, means carried by said axle for effecting frictional engagement with said brake element comprising a stationary backing plate carried at one side of said brake element, a pressure plate axially movable with respect to said axle and carried at the other side of said brake element, said backing plate and pressure plate being lined with friction material, a pressure-responsive force-transmitting member arranged to act on and move the pressure plate against said element, an axially adjustable housing having a fluid pressure chamber therein within which said force transmitting member is reciprocable, an axially fixed annular member threadedly engaging said housing whereby rotation of the member will force the housing to move axially, and means for automatically rotating said annular member to reposition said housing and force transmitting member as said friction material wears, said last-mentioned means including a gear track formed in said annular member, a first gear meshed with said gear track, a second gear arranged to drive said first gear in one direction only, means for rotating said second gear including a hydraulic piston having a gear track formed therein to mesh with said second gear, said piston being moved to rotate said first and second gears by fluid pressure applied to said fluid pressure chamber, normally closed valve means for controlling application of fluid pressure to said piston, and means for opening said valve means comprising a mechanism carried by said housing and actuated by movement of said pressure plate toward said brake element, said mechanism being actuated after a predetermined amount of friction material wear.

3. A wheel and brake assembly comprising a stationary axle, a wheel rotatable on said axle, a brake element rotatable with said wheel, means carried by said axle for effecting frictional engagement with said brake element comprising a stationary backing plate carried at one side of said brake element, a pressure plate axially movable with respect to said axle and carried at the other side of said brake element, said backing plate and pressure plate being lined with friction material, a pressure-responsive force-transmitting member arranged to act on and move the pressure plate against said element, an axially adjustable housing having a fluid pressure chamber therein within which said force transmitting member is reciprocable, an axially fixed annular member threadedly engaging said housing whereby rotation of the member about said axle will force the housing to move axially, and means for automatically rotating said annular member to reposition said housing and force-transmitting member as said friction material wears, said last named means comprising a gear track formed in said annular member, a first gear meshing with said gear track, a second gear connected to said first gear for driving said first gear in one direction only, a curved hydraulic piston rotatably movable relative to said axle for rotating said second gear, said curved piston having a gear track formed therein for meshing with said second gear, valve means for controlling flow of fluid pressure from said fluid pressure chamber to said curved piston, and mechanism for actuating said valve means, said mechanism including an element slidable in said housing, said element being engaged and moved by said pressure plate upon movement thereof toward said rotatable brake element, a cam surface formed on said slidable element, and lever means engaging said cam surface, said lever means opening said valve means upon movement of said slidable element.

4. A wheel and brake assembly including a stationary axle, a wheel rotatable on said axle, a rotatable brake element carried by said wheel, a nonrotatable brake element carried by and axially movable with respect to said axle, brake lining material interposed between said brake elements, a pressure-responsive force-transmitting member arranged to force the brake elements together and against said brake lining material, a source of fluid pressure for actuating said force transmitting member, an axially adjustable housing for said force transmitting member, an annular member threadedly engaging said housing whereby rotation of the annular member will force the housing to move axially, and means actuable by said source of fluid pressure for automatically rotating said annular member to axially reposition said housing and force-transmitting member as the brake lining material wears, said latter-mentioned means including a pressure responsive element drivably connected to said annular member, normally closed valve means for controlling application of fluid pressure to said pressure responsive element, and a mechanism for actuating the valve means including an element axially slidable in said housing and arranged to engage said nonrotatable brake element upon movement of the nonrotatable element toward said rotatable brake element, a cam surface formed in said slidable element, and a lever operatively engaging said cam surface and arranged to open said valve means upon movement of said slidable element by said non-rotatable brake element.

5. A wheel and brake assembly including a stationary axle, a wheel rotatable on said axle, a rotatable brake element carried by said wheel, a nonrotatable brake element carried by and axially movable with respect to said axle, brake lining material interposed between said brake elements, a pressure-responsive force-transmitting member arranged to force the brake elements together and against said brake lining material, a source of fluid pressure for actuating said force-transmitting member, an axially adjustable housing for said force-transmitting member, an annular member threadedly engaging said housing whereby rotation of the annular member will force the housing to move axially, and means for automatically rotating said annular member to axially reposition said housing and force-transmitting member as the brake lining material wears, said latter-mentioned means including a circular pressure-responsive element rotatable relative to said axle and drivably connected to said annular member, said pressure responsive element being actuated by said source of fluid pressure, a gear train between said pressure responsive element and said housing whereby initial movement of said element in one direction is translated into axial repositioning of said housing and force transmitting member, one way clutch means for interrupting gear connection between said housing and said element during movement of said element in the opposite direction, normally closed valve means for controlling application of fluid pressure to said pressure-responsive element, and a mechanism for opening the valve means to allow fluid pressure to act on said pressure responsive element after a predetermined amount of brake lining material wear.

References Cited in the file of this patent

UNITED STATES PATENTS

| | | |
|---|---|---|
| 1,849,584 | Milan | Mar. 15, 1932 |
| 2,048,472 | Sanford | July 21, 1936 |
| 2,089,996 | Fast | Aug. 17, 1937 |
| 2,094,065 | Frank | Sept. 28, 1937 |
| 2,150,867 | Voigt | Mar. 14, 1939 |
| 2,359,516 | Frank | Oct. 3, 1944 |
| 2,386,477 | Kraft | Oct. 9, 1945 |
| 2,404,326 | Taylor | July 16, 1946 |
| 2,419,113 | Bricker | Apr. 15, 1947 |
| 2,548,868 | Christenot | Apr. 17, 1951 |
| 2,554,065 | Shields | May 22, 1951 |
| 2,587,931 | Van Der Wilt | Mar. 4, 1952 |
| 2,669,327 | Chamberlain et al. | Feb. 16, 1954 |